United States Patent [19]

Behn et al.

[11] 4,215,385
[45] Jul. 29, 1980

[54] REGENERABLE ELECTRIC CAPACITOR

[75] Inventors: Reinhard Behn; Gerhard Hoyler; Walter Voelkl, all of Munich, Fed. Rep. of Germany

[73] Assignee: Siemens Aktiengesellschaft, Berlin & Munich, Fed. Rep. of Germany

[21] Appl. No.: 863,794

[22] Filed: Dec. 23, 1977

[30] Foreign Application Priority Data

Jan. 28, 1977 [DE] Fed. Rep. of Germany ....... 2703636

[51] Int. Cl.² ........................................... H01G 1/017
[52] U.S. Cl. ..................................... 361/273; 361/305
[58] Field of Search ................ 24/25.42; 361/273, 305

[56] References Cited

U.S. PATENT DOCUMENTS

| 661,250 | 11/1900 | Lombardi | 264/298 |
|---|---|---|---|
| 2,321,587 | 6/1943 | Davie | 361/305 X |
| 2,934,687 | 4/1960 | Maylandt | 361/273 |
| 3,891,901 | 6/1975 | Booe | 361/305 X |
| 3,955,039 | 5/1976 | Roschy | 361/305 |
| 3,987,348 | 10/1976 | Flanagan | |

FOREIGN PATENT DOCUMENTS

| 182462 | 3/1954 | Austria . |
| 2359432 | 6/1975 | Fed. Rep. of Germany . |
| 181908 | 3/1934 | Switzerland . |
| 768366 | 2/1957 | United Kingdom . |
| 882179 | 11/1961 | United Kingdom . |

Primary Examiner—E. A. Goldberg
Attorney, Agent, or Firm—Hill, Van Santen, Steadman, Chiara & Simpson

[57] ABSTRACT

In a regenerable electric capacitor, particularly for a.c. voltage applications, the metal coatings consist of an alloy of aluminum and a metal whose oxides possess a specific resistance $\rho < 10^9$ Ωcm. Alloy metals are preferably copper or zinc, and maganese, tin, silver, chromium, iron or lead are also suitable. With the alloy of the invention, the coating decomposition is prevented by the increased edge field strengths.

1 Claim, 2 Drawing Figures

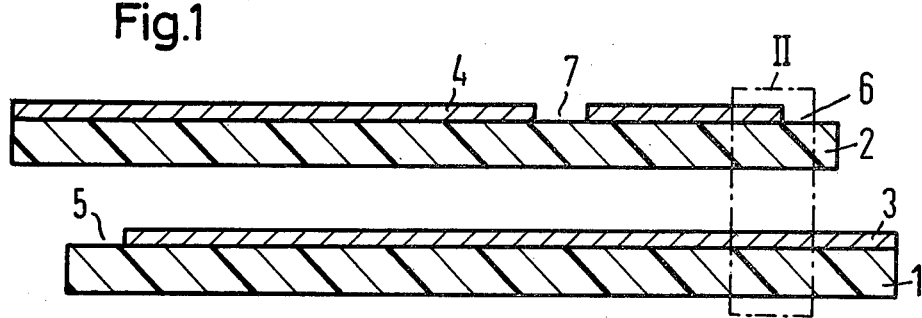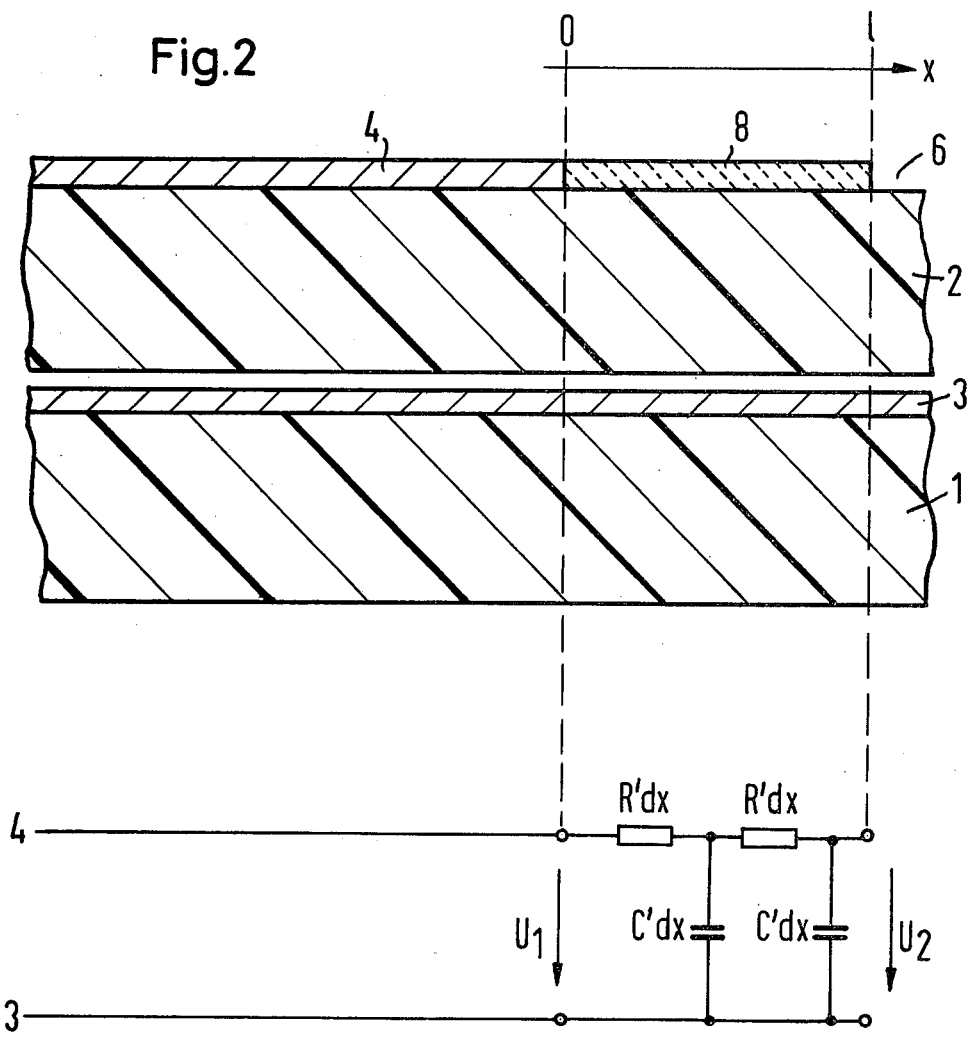

REGENERABLE ELECTRIC CAPACITOR

BACKGROUND OF THE INVENTION

1. Field of the Invention

The present invention relates to a regenerable electric capacitor, and more particularly to such a capacitor for a.c. voltage applications which comprises wound-on layers of synthetic foils which have been provided with metal coatings, where metal-free edge strips are arranged along the longitudinal sides of the foils, and to a process for the production of such capacitors.

2. Description of the Prior Art

Capacitors of the general type discussed above are well known in the art. At high field strengths, capacitors heretofore known generally possess capacitance values which decrease with increasing operating duration. The reason for this is that the vapor-deposited metal coatings exhibit characteristic changes during continuous operation on the overshooting of an a.c. field strength which is dependent, for example, upon the nature of the foil, the thickness of the foil and the coating metal. This is due to the fact that with the low coating thickness, due to the high edge field strengths which have 10 to 100 times higher values than the homogenous field strength within the capacitor, in the presence of moisture and/or oxygen, he aluminum metal coating is transformed, starting from the edges of the coating and the pores in the coating surface to form highly insulating aluminum oxide and/or aluminum hydroxide. The speed at which the coating disintegrates, therefore, increases in proportion to the content of water vapor and/or oxygen in the atmosphere with which the capacitor comes into contact. In order to overcome these difficulties, it is known to dry the capacitors referred to above in a vacuum at increased temperatures and to protect the capacitors from the entry of water vapor and/or oxygen by means of careful installation, such as, for example, casting the capacitors in epoxide resin.

It is known to protect the capacitor installed in a housing by at least partially filling the capacitor container with substances which absorb oxygen and/or water vapor. In this connection, one may refer to the German published application No. 2,415,314.

Furthermore, it is known in the art to fill the capacitor housing with a suitable insulating liquid, as disclosed, for example, in the German published application No. 2,539,781, which corresponds to U.S. Pat. No. 3,987,348.

In addition, the German published application No. 2,359,431 discloses a capacitor in which the high edge field strength is disintegrated in that an edge strip composed of a metal, in particular aluminum, having a thickness of less than 25 nm, is applied, and is subsequently converted into a highly ohmic compound by an electrochemical and/or chemical and/or temperature process in the presence of oxygen and/or water. This process is not very suitable for regenerable capacitors as the danger exists that the entire coating will be come oxidized during the treatment.

SUMMARY OF THE INVENTION

The object of the present invention is to provide a regenerable electric capacitor, in particular for a.c. voltage applications, which does not exhibit the above-mentioned capacitance disintegration during operation in atmospheres containing water vapor and/or oxygen, and which furthermore has good regeneration properties.

This object is realized, according to the invention, in that the metal coatings of the capacitor consist of an alloy of aluminum with at least one metal coating whose oxide, or oxides, possess a specific resistance $\rho < 10^9 \Omega \text{cm}$.

Preferably copper and/or zinc are employed in the alloy, but also maganese, tin, silver, chrome, iron and/or lead may be used as suitable alloy materials.

According to a particular feature of a capacitor constructed in accordance with the invention, the metal coatings contain 15 to 80 atom % aluminum.

According to another particular feature of the invention, the thickness of the metal coatings amounts to 10 nm 40 nm.

According to a particular feature of the invention, the thickness of the metal coatings amounts to approximately 20 nm.

According to another feature of the invention, the synthetic foils which carry the metal coatings comprise either polypropylene, polycarbonate, polyethylene terephthalate or cellulose acetate.

In a process for producing a capacitor, according to the present invention, the metal coatings are vapor-deposited onto the synthetic foils in a continuous process and the alloy metal is fed to the vaporizor in the form of wires.

According to a particular feature of the process of the invention, the metal wires are constructed to have a core composed of one alloy component, preferably aluminum, to which a second alloy component is galvanically applied.

According to another feature of the invention, two separate wires, one of aluminum and the other of another of the alloy components may be separately fed to the vaporizer or to separate vaporizers.

The advantages of a capacitor constructed in accordance with the present invention is that capacitors with coatings of the particular type set forth above, can be operated without expensive drying and/or installation measures at high a.c. field strengths without any reduction in capacitance occurring.

BRIEF DESCRIPTION OF THE DRAWING

Other objects, features and advantages of the invention, its organization, construction and operation will be best understood from the following detailed description, taken in conjunction with the accompanying drawing, on which:

FIG. 1 illustrates the fundamental construction of a capacitor in accordance with the present invention; and FIG. 2 is an enlarged illustration of a portion of the capacitor of FIG. 1, together with an approximate schematic circuit diagram.

DESCRIPTION OF THE PREFERRED EMBODIMENTS

FIG. 1 illustrates the fundamental construction of a capacitor in accordance with the invention. A pair of synthetic foils 1, 2 are provided with regenerable metal coatings 3, 4 and have metal-free edge strips 5, 6 along their longitudinal sides. The metal coatings 3, 4 are contacted by Schoop layers (not illustrated on the drawing) on the two end sides of the capacitor roll. The synthetic foils 1, 2 illustrated on the drawing are wound so as to be somewhat offset, in order to improve the electrical and mechanical contact between the Schoop layers and the metal coatings 3, 4. The relative sizes illustrated on the drawing are not true to scale, but have been distorted in order to improve the clarity of layout. The regenerable metal coatings 3, 4 can contain metal-free pores 7.

The synthetic foils 1, 2 are preferably made of polypropylene and have a thickness of, for example, 10 μm; however, it is also possible to use other materials which are suitable for regenerable capacitors, such as, for example, polycarbonate, polyethylene terephthalate, or cellulose acetate. The metal coatings 3, 4 have a thickness of between 10 nm and 40 nm, preferably approximately 20 nm. The metal coatings consist of a vapor-deposited alloy of one or more metals whose oxide has a specific resistance $\rho < 10^9 \Omega cm$. It is particularly advantageous to use alloys of aluminum with copper and-/or zinc. However, it is also possible to use alloys of aluminum with maganese, tin, silver, chrome, iron and-/or lead. The aforementioned alloys contain 15 to 20 atom % aluminum.

Referring to FIG. 2, an enlarged portion of FIG. 1 designated in FIG. 1 at II, is illustrated at the edge zone of the metal coatings 4, with the associated equivalent circuit diagram. Here, the nonmetallic, oxidized portion 8 of the metal coating 4 extends from the point $x=0$ to the point $x=1$. Here, the reference $U_1$ is the voltage between the coatings 3 and 4 at the point $x=0$ and $U_2$ is the voltage between the oxidized portion 8 of the metal coating 4 and the counter-coating 3 at the point $x=1$. The edge field strength, and thus the disintegration of the coating, are governed by the ratio of these two voltages and by the length l of the oxide zone 8. If l is very small, for example less than 1 μm, and $|U_2/U_1|$ is likewise very small, this means that the voltage $U_1$ connected to the metal coatings 3, 4 in the oxide zone 8 fall virtually to 0 on the very small path $l < 1$ μm. If the field strength exceeds a certain degree at this point, a spark-over occurs from the point $x=0$ to the point $x=1$. This spark-over can occur several times in the same half period of the a.c. voltage and be repeated in all further half periods. The active oxygen which arises in this microcorona discharges further oxidizes the metal coating and the observed, constant regression of the coating edge at the point $x=0$ occurs. Only when the voltage drop from $U_1$ to $U_2$ extends over a longer path l across which no spark-over occurs, can the oxide zone 8 fulfill its function of reducing the edge field strength to a harmless degree.

This is also the reason why the aluminum previously employed as coating metal, which forms a highly insulating oxide, does not fulfill this requirement, as the voltage connected to the coatings drops considerably on extremely short paths, and thus sets in motion the described mechanism which is no longer halted.

Coating metals which possess oxides having a lower specific resistance than the aluminum, such as, for example, the zinc which is likewise employed, do not resolve the problem because they would require relatively wide oxide zones in order to achieve a reduction in the edge field strength. However, the formation mechanism imposes limits upon the length of the oxide zones. A further difficulty in coating metals having oxides of a low specific resistance resides in the fact that the unsatisfactory self-healing capacity of such layers, referred to above, in the case of electric breakdowns through the dielectric. In this respect, of all metals, aluminum is the most favorable. Also, in respect of chemical corrosion, aluminum is superior to the metals having oxides of a low specific resistance.

The metal coatings of the capacitor constructed in accordance with the present invention, which consist of an alloy of aluminum with one or more than one metal whose oxide possesses a specific resistance $\rho < 10^9 \Omega cm$, possess the advantage of pure aluminum vapor-deposited layers, such as, for example, good self-healing capacity and good chemical corrosion resistance, without being subject to the above-described coating disintegration at high a.c. field strengths.

For the production of the capacitor in accordance with the present invention, the metal coatings are vapor-deposited onto the synthetic foils in a continuous process, and the alloy metal is fed to the vaporizer in the form of wires.

A particularly advantageous embodiment is characterized by the use of a wire having a core consisting of one alloy component, preferably aluminum, to which the second alloy component is galvanically applied. The thickness ratio between core and casing here is determined by the desired mixture ratio.

In accordance with the invention, two metals can simultaneously be vapor-deposited from two different vaporizers, the mixture ratio being set by the vaporization rates of the two vaporizers. Furthermore, with the present invention it is possible to achieve an alloy vaporization by employing one single vaporizer which is supplied with two different wires.

The invention is not limited to the exemplary embodiments illustrated and discussed herein, and in particular it is also possible to employ different alloy metals, provided these correspond to the set requirements. Furthermore, the invention can be applied to capacitors which consist of wound-on synthetic foils to which metal coatings are applied on both sides, as even with these capacitors the increased edge field strength can give rise to a coating disintegration starting from the free edges.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a regenerable electric capacitor, in particular for a.c. voltage applications, of the type in which wound layers of synthetic foils carry metal coatings and capacitor plates and wherein metal-free edge strips are arranged on the longitudinal sides of the foils, the improvement wherein said metal coatings comprise an alloy of aluminum and at least one metal whose oxide has a specific resistance $\rho < 10^9 \Omega cm,$ wherein said at least one metal is copper.

* * * * *